Feb. 23, 1960

A. D. WHITE 2,926,277

GASEOUS DISCHARGE DEVICES

Filed May 9, 1956

INVENTOR
A. D. WHITE
BY
ATTORNEY

United States Patent Office 2,926,277
Patented Feb. 23, 1960

2,926,277

GASEOUS DISCHARGE DEVICES

Alan D. White, Plainfield, N.J., assignor to Bell Telephone Laboratories, Incorporated, New York, N.Y., a corporation of New York Application May 9, 1956, Serial No. 583,671

30 Claims. (Cl. 313—209)

This invention relates to gaseous discharge devices and more particularly to such devices of the cold cathode glow discharge type.

Gaseous discharge devices having but a pair of electrodes generally have a current-voltage characteristic that exhibits an initial negative resistance portion immediately following the gaseous breakdown and limited to a very narrow range of quite small currents, as of the order of microamperes. Further, this initial negative resistance portion is quite unstable in that it is almost impossible to operate a gaseous discharge at any particular point on the characteristic. Following this initial negative resistance portion the characteristic generally is positive in the abnormal discharge portion, the voltage increasing with increase of current through the device. In the abnormal discharge portion of the characteristic the cathode is completely covered with the negative glow and usually when the cathode current is increased, thereby increasing the cathode current density, the voltage drop of the cathode region also increases.

It has been found, however, that a stable reproducible negative resistance portion of the characteristic may be obtained at large operating currents and over a limited range of currents but wide range of frequencies if the cathode has a particular configuration and the cathode configuration, anode positioning, and gas pressure are related to each other in specific ways to attain this result. Such gaseous diodes with negative resistance characteristics are fully disclosed in application Serial No. 169,121, filed June 20, 1950, of M. A. Townsend, now United States Patent 2,804,565, issued August 27, 1957.

Such devices may particularly advantageously be employed in telephone switching networks, such as disclosed in Patent 2,684,405, issued July 20, 1954, of E. Bruce and H. M. Straube, wherein the gaseous diodes define cross points in the network and in the talking paths through the network. The number of stages in the network and accordingly the number of talking paths through the network and the number of lines and trunks that may be interconnected by the switching network are dependent, in part, on the voltage margins at the individual cross points to assure against false breakdown of a device. In order to increase this margin it is desirable that the breakdown voltage be high and the margin between breakdown and sustaining voltages for each device be as large as possible. If the margin between breakdown and sustaining voltages is not high, the number of such devices that may be employed in the switching network is unduly limited by the possibility of erroneous breakdown of a cross point device in the network due to the possibility of cumulative variations in sustaining voltages of the devices in the network.

The breakdown voltage of a gaseous discharge diode is dependent both on the structure of the diode and on the operating conditions. Specifically, the breakdown voltage is a minimum when the device is operated at the $pd$ minimum of the Paschen curve, generally referred to as the Paschen minimum; this point of minimum breakdown voltage is determined by the product of the anode-to-cathode distance $d$ and the gas pressure in the cathode region $p$. It would therefore seem desirable to operate such devices away from the Paschen minimum. However, another factor comes into consideration; the operating margins of the network are dependent on the sustaining and breakdown voltages of the various discharge devices in the network being constant, both within a single device and between devices. It is only at the Paschen minimum that the breakdown voltage is not appreciably affected by slight variations in either the anode-to-cathode spacing $d$ or the gas pressure in the anode-cathode region $p$. It is possible to determine the initial spacing $d$ very accurately and reproducibly between different devices, as by ionically etching away the anode tip to determine the spacing, as disclosed in my application Serial No. 496,391, March 24, 1955, now United States Patent No. 2,825,618, issued March 4, 1958; it is also possible to mount the cathode to compensate for pressure changes in the gas in the region immediately adjacent the cathode due to heating of the gas in this region, as by supporting the cathode on a thermally responsive element, as disclosed in application Serial No. 496,431, March 24, 1955, of V. L. Holdaway, now United States Patent 2,891,188, issued June 16, 1959. However, the manufacture of the devices and their structure are simplified if the breakdown voltage when operated at the Paschen minimum is high enough and the difference between breakdown and sustaining voltages large enough to allow for operation at the Paschen minimum.

Further, because such devices, when utilized in telephone switching networks, are advantageously employed in the talking paths through that network, the useful life of the device, which is basically the useful life of the cathode, becomes of considerable importance. The cathodes employed in such devices are a form of what is known in the art generally as "hollow cathodes," i.e., a cathode having opposed emitting surfaces such that electrons emitted by the one surface which travel through the cathode fall region of that surface are in the cathode fall region of the other surface. Accordingly, these cathodes are very efficient emitters and may be operated at high currents. However, lifetime problems have arisen, particularly due to sputtering of the surfaces of the cathode.

It is an object of this invention to provide an improved gaseous discharge diode having a stable negative resistance characteristic in the abnormal discharge region.

It is another object of this invention to increase the breakdown voltage of gaseous discharge devices. Thus, it is an object of this invention to enable gaseous discharge devices employable in switching networks to be operated at the Paschen minimum.

It is still another object of this invention to increase the anode-cathode spacing for noise-free operation in discharge devices having a negative resistance characteristic.

It is a further object of this invention to increase the operating life of gaseous discharge devices exhibiting a negative resistance characteristic in the abnormal discharge region.

A still further object of this invention is to increase the current range over which there is a negative resistance characteristic in the abnormal discharge region.

In specific illustrative embodiments of this invention the device comprises an enclosing enevelope having a gaseous filling, the particular gas or mixture of gases and gas pressures being related to the other parameters so as to attain the negative resistance characteristic. Positioned within the envelope are an anode and a cathode, which is a source of high electron emission density. A physical barrier, in accordance with an aspect of my invention, is positioned between the cathode and the anode and has an aperture therein serving to constrict the discharge current flow between the cathode source and the anode. I have found that this constriction together with a proper correlation of the other elements attains a negative resistance characteristic with improved results over the attainment of the negative resistance characteristic solely by cathode configuration properly related to the other device elements and parameters. These advantages are discussed further below.

The barrier having the constriction or aperture therein is electrically connected to the cathode and should have a higher sustaining voltage than the cathode. As it is interposed between the cathode and the anode the initial discharge breakdown will be to the barrier; because of this difference in sustaining voltages, however, the discharge initiated to the barrier will move through the constriction into the cathode. The barrier may advantageously be formed integrally with the cathode and the constriction provided therein by an orifice in the barrier. In such an embodiment of my invention the cathode may define a small cavity in a metallic member or members beneath an overlying portion which comprises the barrier. I have found it advantageous to employ hollow cathodes and particularly a form of hollow cathode wherein the hollow portion is substantially spherical.

In embodiments of my invention employing a constriction interposed between the cathode and anode, as described above, and wherein the size of the constriction is properly related to the gas filling, pressure, and electrode positions to attain substantially the same negative resistance properties in the abnormal discharge region as prior devices of the type disclosed in the above-mentioned M. A. Townsend patent, I have found a number of advantages and improved operating characteristics over such prior devices. Specifically, in embodiments in accordance with my invention the anode-cathode gap spacing for noise-free operation, expressed as a product of pressure and distance, is increased over values obtained with hollow cathodes of the type disclosed by Townsend and without a constriction of the discharge in accordance with my invention. In this manner the breakdown voltage may be considerably increased, thereby increasing the operating margins in switching networks incorporating such devices. Specifically, in a device without a physical barrier and constriction, the anode limit, as defined in the above-mentioned Townsend patent, limited the $pd$ product in a specific tube to a value of 7 millimeters of mercury-centimeters and a breakdown voltage of 210 volts; in a specific embodiment in accordance with my invention and including a constriction, but otherwise having the same operating characteristics, the $pd$ product was 12 millimeters of mercury-centimeters and the breakdown voltage was 240 volts.

Additionally, I have found that in devices in accordance with my invention the inductive lag of the device is reduced, improving their transmission as well as switching characteristics. Further, the loss of cathodic material as a result of sputtering by positive ions and the gas clean-up resulting from such sputtering are minimized by the positioning of the barrier between the cathode and anode, while still attaining, because of the constriction, the desired negative resistance characteristic. A still further advantage that I have obtained in devices incorporating aspects of my invention is to extend the cleansing action of the discharge glow to areas external to the cathode source itself and surrounding the constriction in such a way that a clean surface on the barrier is maintained for constant and reproducible breakdown.

A further advantage of devices in accordance with my invention over the prior negative resistance gas diodes of the Townsend patent is a lower sustain voltage for the device operating at the same cathode current and with the same gas pressure. While the difference may be only of the order of 4 to 6 volts, percentagewise and with regard to the margin requirements of switching networks using these devices, this decrease in sustain voltage is of considerable importance.

The cathode and barrier having the constriction therein may be of a number of different physical forms. One specific embodiment of my invention that I have found to have particularly advantageous characteristics comprises a cathode including a metallic member or members defining a small spherical cavity communicating to the anode-cathode gap through a small orifice at one edge of the cathode. The spherical or substantially spherical cavity defines the cathode source of high density electron emission, and the upper enclosing metallic portion of the spherical cavity is the physical barrier interposed between the cathode source and the anode. The small orifice extending between the interior of the spherical cavity and the anode-to-cathode gap, and thus through the physical barrier, serves as the constriction for constricting the discharge and assuring a satisfactory negative resistance characteristic. The orifice size and the dimensions of the cavity in the cathode are determined in relationship to the gas, gas pressure, and secondarily the anode positioning, to attain the stable negative resistance characteristic at the high currents desired, i.e., in the range of the abnormal glow discharge. The size of the dimensions can be appreciated from one specific embodiment wherein the width of the orifice was 0.007 inch, the depth of the cavity was 0.030 inch, and the greatest width of the cavity 0.026 inch, the cavity being substantially spherical. However, while the dimensions of the elements are critical with respect to each other to attain the meritorious results of my invention, I have found that they may be varied considerably over different ranges, if the other parameters of the device are compensatingly varied, as described further below.

I have found in embodiments of my invention wherein the high electron emission source is a substantially spherical cavity in a metallic member directly adjacent the constricting orifice, as by being formed integrally therewith as described just above, the constriction is advantageously of a circular configuration with a diameter of between one-half and one-tenth the sphere diameter of the cathode source. Further, the various advantages attainable in embodiments of my invention, some of which advantages have been discussed above, are optimized if the ratio of orifice diameter to cathode cavity diameter lies in the range of between one-third and one-sixth.

The constricting orifice diameter is related, not only to the diameter of the spherical cavity, but also to the gas pressure. I have found that the product of orifice diameter, $d_o$, and gas pressure, $p$, should be within a prescribed range. This product, $pd_o$, should be large enough so that the discharge glow can readily enter the high density cathode region at the tube operating current. However, the product must be maintained small enough so that the advantages of this invention may be attained without loss of the desired negative resistance characteristic. I have found values in the range $0.6 < pd_o < 5$ to be satisfactory, wherein $p$ is expressed in millimeters of mercury and $d_o$ in centimeters.

When the high density emission source is a spherical cavity cathode, as discussed above, there is accordingly a similar restriction placed on the product of cavity diameter, $d_c$, and gas pressure for satisfactory operation. I have found the range of values $4 < pd_c < 30$ to provide satisfactory operation in embodiments of this invention, wherein again $p$ is expressed in millimeters of mercury and $d_c$ in centimeters.

In the embodiment described above wherein the cathode and barrier are formed integrally and the cathode is defined by a spherical cavity, the cathode is of metal and may be formed of a single metallic piece or of several pieces. Thus, the cathode may be of tungsten, tantalum, columbium, molybdenum, or other metal known in the art. The spherical portion may be formed, in accordance with another aspect of this invention, by drilling a hole into a rod and passing a current discharge to the rod for a sufficient period of time, as for several hours, to cause a complete self-forming of the cathode, as discussed further below. Or the cathode may comprise a hollow bead with a central aperture therein, the bead being fitted over the end of a cathode support rod and defining therewith the spherical cavity, as disclosed in application Serial No. 583,665, filed May 9, 1956, of R. L. Mueller and W. G. Stieritz, now United States Patent 2,899,588, issued August 11, 1959.

The size of the cathode support or rod, apart from the dimensions of the cavity and orifice, is not critical. It may advantageously have a relatively large area or be provided with fins to enhance heat radiation therefrom. Alternatively, it may be of very small mass to minimize transient delays due to initial heating of the cathode on breakdown of the discharge.

The anode of the device is positioned sufficiently close to the dense plasma of the cathode region to prevent the occurrence of anode noise and may, as discussed above, be positioned so as to be at the $pd$ minimum of the Paschen breakdown curve or further removed to increase the breakdown voltage. The anode may be of any general shape; thus, it may be a plate or a wire. Having an anode defined by the tip or end-on portion of a wire or rod has, however, certain advantages in attaining higher breakdown voltages. Further, with a rod anode, the anode may be offset from the orifice in the cavity cathode, thereby additionally serving to prevent the growth of the anode due to sputtered cathodic material, which growth during the life of the device would cause a variation in the breakdown voltage and could even result in a shorting of the anode to the cathode because of the close spacing involved, as of the order of 0.005 inch.

The amount of sputtering in various embodiments of this invention is actually very slight, which aids in increasing the life of the cathode and of the gaseous discharge device. Most of the material that is sputtered from one portion of the inner surface of the spherical cavity is deposited on another portion of the cavity. As mentioned above, if the cavity is initially properly formed, a greater or lesser amount of self-forming will take place so that, for the particular gas and pressure, the cavity will form itself into its optimum shape by sputtering material from certain portions and depositing them on other portions. After this self-forming has occurred the interior configuration of the cavity will tend to remain fairly constant with sputtered material being redeposited on different inner surfaces without appreciably changing the shape of the cavity. Because of the small size of the orifice very little material will be sputtered out of the cathode and if that material is ionically charged, it may be returned to the outer surface of the cathode.

Also, because of the interposition of the constriction between the cathode and the anode, substantially all ionization products formed within the cathode space, such as ions, metastables, excited atoms, or photons, are retained within the cathode space, increasing the efficiency of the cathode.

I have found it preferable to form the constricting orifice substantially into a circle, as this retains a desired degree of symmetry. However, a negative resistance characteristic and other advantages of my invention can be attained if the constricting orifice is of a different shape. Similarly, the barrier may be either thin or thick, causing the constriction to be either shallow or deep.

In prior gaseous devices of the type disclosed in the above-mentioned Townsend patent wherein the negative resistance characteristic is attained by a correlation of cathode shape and dimensions with the other elements of the device, a negative resistance over only a limited range of currents in the abnormal discharge region can be attained. This range, which may be of from about 8 to 16 milliamperes, includes the current values of interest for cross point switching networks. However, I have found that in embodiments in accordance with my invention wherein the negative resistance characteristic is apparently predominantly determined by the constriction in the barrier, the resistance characteristic is negative for substantially all values of current following the initial breakdown. In specific devices the resistance may not be negative at all possible values of current; however, by varying the gas pressure within the device different current ranges may be attained over which a negative resistance occurs. Thus, I have found that the current and pressure are correlated in embodiments in accordance with my invention such that a negative resistance is obtainable when the product of current, $i$, in amperes, and pressure, $p$, in millimeters of mercury is within the range $0.2 < ip < 2.8$. This range, by change in pressure, may be made to cover substantially all usable values of current in the abnormal discharge range.

Accordingly, devices in accordance with my invention and employing a constricting orifice in the discharge path may be utilized at substantially any current value, with the exception that the currents should not be in the very low current unstable negative resistance region immediately following breakdown. At this region the discharge characteristics are too unstable to be of value. It might be pointed out that prior to the Townsend device, it was thought and believed that this unstable region was the only negative resistance region of the current-voltage characteristic. Devices in accordance with Townsend's invention have a negative resistance characteristic over a range of currents in the abnormal discharge. However, I have been able in embodiments in accordance with my invention to extend this negative resistance region over a large range of currents in the abnormal discharge.

Many of the gases or gaseous mixtures known in the art may be employed and similarly the cathode may be of various materials known in the art. The cathode, however, should advantageously be of a low work function material having a low vapor pressure. Exemplary cathodic materials include molybdenum, tantalum, tungsten, columbium, zirconium, or other materials, including coated cathodes.

It is a feature of this invention that a stable negative resistance characteristic be attained at high values of operating current in a gaseous discharge device by interposing a physical barrier between a cathode and an anode, the barrier having an orifice therein to constrict the discharge between the cathode and anode.

It is another feature of this invention that the cathode be a source of high current emission. Specifically, it is a feature of certain embodiments of this invention that the cathode comprise a spherical cavity.

It is still another feature of this invention and of certain embodiments thereof that the cathode and barrier be formed integrally, the cathode comprising a hollow substantially spherical portion closely adjacent one edge and communicating through a small orifice in that edge to the cathode-anode gap. The edge accordingly defines the physical barrier between the cathode and anode and the orifice therein, the constriction through which the discharge emanates.

It is a further feature of this invention that the cathode and physical barrier be electrically connected together, the discharge sustaining at a lower voltage in the cathode than on the surface of the barrier facing the anode, whereby the discharge on breakdown to the barrier face moves through the orifice into the cathode.

It is a still further feature of this invention that the cavity cathode having a spherical or hollow configuration to attain the desired high electron emission, should have its spherical or equivalent spherical dimensions correlated to the gas pressure and equivalent diameter of the constricting orifice to attain the negative resistance characteristic. Specifically, the product of orifice diameter, $d_0$, and gas pressure should be within the range $0.6 < pd_0 < 5$ and the product of cathode cavity diameter, $d_c$, and gas pressure should be within the range $$4 < pd_c < 30$$

where pressure is expressed in millimeters of mercury and distances in centimeters.

A complete understanding of this invention and of these and various other features thereof may be gained from consideration of the following detailed description, together with the accompanying drawing, in which.

Figure 1:
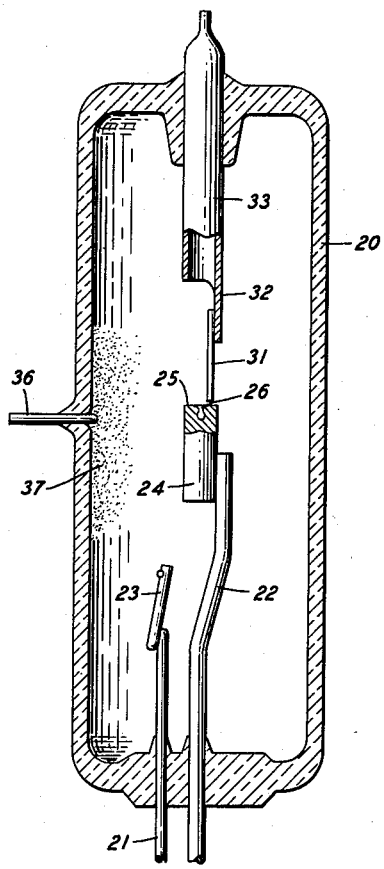
Fig. 1 is a plan view of a gaseous discharge device illustrative of one specific embodiment of this invention employing a spherical cavity cathode and integral barrier having the constriction therein, a portion of the envelope being broken away to show the interior elements more clearly.

Turning now to the drawing, the specific illustrative embodiment depicted in Fig. 1 comprises a glass envelope 20 having a gaseous filling therein, as of neon, helium, or mixtures of these gases. Extending from the base of the envelope are a pair of leads 21 and 22. Lead 21 supports a getter 23, advantageously of barium, as discussed further below. Lead 22 supports a cathode rod 24, which may advantageously be of molybdenum, tantalum, tungsten, or other metal known in the art; at the upper edge 25 of the cathode rod is formed the cavity cathode 26, best seen in Fig. 2, which comprises a hollow substantially spherical portion 28 communicating to the edge 25 and thus to the anode-cathode gap through a small orifice 29.

The anode 31 comprises a wire or rod of an appropriate metal, as a 0.003 inch diameter molybdenum wire, which is supported opposite the cathode edge 25 as by being secured, as by welding, to the inner surface of a finger 32 extending from but integral with metallic tubing 33. Tubing 33 may advantageously be of Kovar to facilitate the sealing of the tubing to the glass envelope 20. Further, the tubing 33 may conveniently serve as the tubulation for exhausting the envelope and filling it with the appropriate gas or gaseous mixture, the tubulation then being pinch closed or welded, as is known in the art.

By connecting the anode 31 to the inner surface of the finger 32 the proper off-center anode wire spacing is attained; thus, the anode 31 is not positioned directly opposite the orifice 29 in the cavity cathode 26 but advantageously to one side thereof so that the possibility of sputtered cathodic material emanating from the cavity cathode and depositing on the anode is greatly reduced. The anode spacing is determined by the distance from the end of the anode wire 31 to the nearest portion of the cathode edge 25 and may advantageously be chosen so that the breakdown potential is at the $pd$ minimum of the Paschen curve.

Extending through a side wall of the envelope 20 is another lead 36. Lead 36 protrudes through the envelope sufficiently to make contact with the barium coating 37 on the inner wall of the envelope 20 due to flashing of the getter 23. The getter may advantageously be flashed in the envelope in the conventional manner during the exhaust process just before the gas filling is introduced. The getter is positioned so that a major portion of the barium is deposited onto the envelope to form the coating 37.

The getter flash 37 then acts as a photosensitive surface which, when suitably connected to the cathode and exposed to ambinet light, provides residual ionization in the anode-cathode gap and makes for rapid starting or breakdown. The connection to the cathode advantageously is made through a high resistance, as of the order of 50 megohms, to reduce the ion current to the getter flash 37 while the main gap is conducting, as currents of the order of several microamperes may be detrimental to the photosensitive surface and may cause deterioration with life. It is, of course, to be understood, however, that other methods known in the art for obtaining residual ionization may also be employed and that this invention is not to be considered as limited to the employment of photoelectric emission from a cathode as a source of initial current to reduce the statistical delay in breakdown of the tube. Thus, radioactive materials may be employed; however, when a large number of these devices are utilized together, as in a large switching network, it has been found that the total amount of radioactive material present in all such devices may represent a serious radiation hazard.

In the operation of embodiments of my invention breakdown occurs between the anode 31 and the surface of the physical barrier interposed between the anode and the cathode source, which in this embodiment is the upper surface 25. It is therefore advantageous to have a high breakdown voltage. The discharge sustains, however, not to the barrier but to the cathode source of high density electron emission, which in this embodiment is the hollow spherical cavity 26. It is therefore desirable that the sustaining voltage of the cathode be lower than that of the barrier, as by having a lower work function or due to configuration of the cathode source. The barrier and the source are electrically connected together, which ensures the breakdown and sustain operation just described, and may, as in the embodiment depicted in Fig. 1, be formed integrally.

Figure 2:
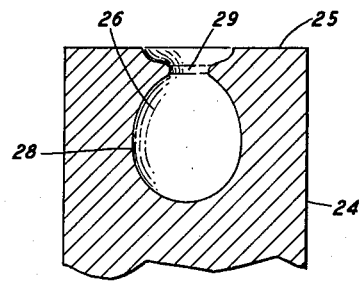
Fig. 2 is a sectional view of the cavity cathode of the embodiment of Fig. 1.

In Fig. 2 there is depicted the cross section of a particular cavity cathode 26, as determined from a microphotograph, for the embodiment of this invention depicted in Fig. 1. In this specific embodiment the high density electron emitter is defined by a hollow cathode having the shape of a substantially spherical cavity 28.

Interposed between this cavity and the anode 31, or the main portion of the anode-cathode gap, is a physical barrier which in this embodiment is defined by the upper edge 25 of the rod 24; accordingly, in this embodiment the barrier and the cathode are physically integral and formed together. The orifice which constricts the discharge extending from the cathode to the anode, thereby attaining the advantages and improved operating conditions of negative resistance gaseous discharge devices in accordance with my invention, is the aperture 29 in the upper edge 25.

In accordance with aspects of my invention the dimensions of the spherical cavity 28 and orifice size 29 are related to each other and to the gas pressure in order to attain the stable negative resistance characteristic over wide ranges of currents. Specifically, I have found that the orifice diameter, $d_o$, should be from one-half to one-tenth the spherical cavity diameter, $d_c$, and further that various of the advantages of my invention are optimized if the ratio of orifice to cavity diameter is in the range of from one-third to one-sixth. These, and other relationships given herein, are based upon substantially circular orifices and substantially spherical cavities; in embodiments wherein the orifices or cavities depart from such configurations, the ratios are to be understood as applying to the diameters of the equivalent circles or spheres.

The dimensions of the cathode can also be varied with respect to the gas pressure. Both the constricting orifice diameter and the cavity diameter may be increased by decreasing the gas pressure, without substantially changing the operation of the device. Specifically, I have found that satisfactory negative resistance characteristics can be attained if the orifice and cavity diameters and gas pressure are so related to each other that the product of pressure and orifice diameter is in the range of $0.6 < pd_o < 5$ and the product of pressure and cavity diameter is within the range $4 < pd_c < 30$, wherein pressure is expressed in millimeters of mercury and distance in centimeters. If a gaseous mixture is employed, the pressure is the total pressure of the mixture.

Figure 3:
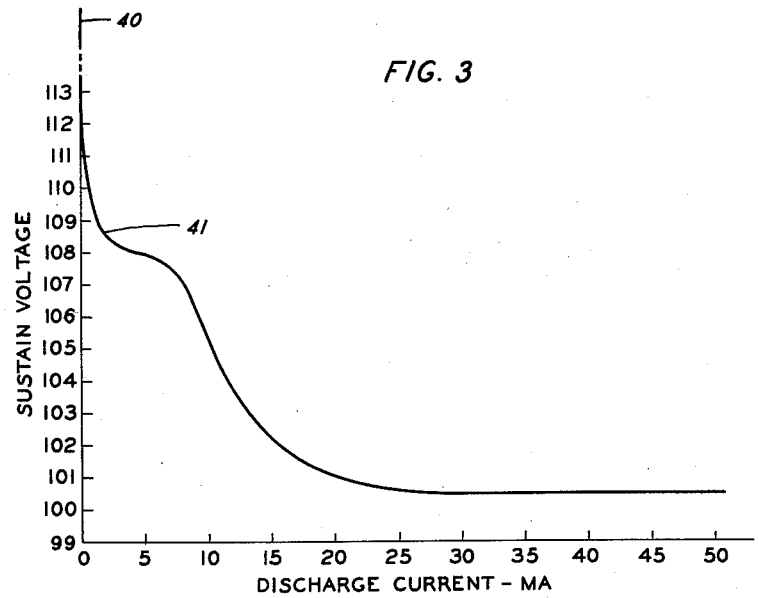
Fig. 3 is a graph depicting the general shape of the current-voltage characteristic for various embodiments of this invention.

The various advantages and relationships involved in embodiments of my invention can be further understood by reference to and discussion of the graphs of Figs. 3 through 9. Fig. 3 depicts the general shape of the voltage-current characteristic of various embodiments of the invention and illustrates particularly the extended negative resistance portion at stable operating currents in the abnormal discharge region. The breakdown voltage will be at point 40, and from that point to such a point as 41 the resistance of the device is markedly negative; this is, however, an unstable resistance at exceedingly small currents and of little value. The existence of this negative resistance portion of the voltage-current curve is, of course, well known in the art.

This first unstable negative resistance would, in usual gaseous discharges, continue until the point 41 which would be the minimum sustaining voltage of the device. Priorly it was considered that from this minimum sustaining voltage the characteristic was positive, the voltage increasing with increasing current, until a voltage sufficiently high was reached, at very high currents, that arcing occurred. By employing the structures set forth in M. A. Townsend application Serial No. 169,121, filed June 20, 1950, now United States Patent 2,804,565, issued August 27, 1957, for the first time a stable negative resistance at usable operating currents in the abnormal discharge was attained. As set forth in that application, the characteristic of devices as therein described is such that the voltage increases, from the minimum sustaining voltage, with increase in current until a specific value of current is attained; at that particular current value and for a limited range of higher values, the voltage decreases, thereby giving a negative resistance. Following this negative resistance portion the characteristic is again positive and similar to that of priorly known discharges.

In the Townsend devices the negative characteristic is attained by the combination of specific cathode configuration and dimensions, critically related to the gas pressure and anode spacing. In embodiments of my invention I believe the negative resistance characteristic to be determined primarily by the constricting orifice interposed between the cathode and the anode, and secondarily by the cathode configuration and gas pressure, although these must be related to the orifice diameter within certain limits to attain the negative resistance. By interposing the physical barrier and constricting orifice between the cathode and anode in the Townsend devices I have greatly improved the operation and negative resistance characteristics of gaseous discharge devices. This can be seen, in part, from Fig. 3. In contradistinction to priorly considered characteristics which were entirely positive in the abnormal discharge region and to Townsend's characteristic, which for the first time realized a negative resistance in the abnormal discharge region but over only a limited current range, devices in accordance with my invention have a negative resistance over a very wide current range and, by proper choice of pressure, over substantially the entire usable range of the abnormal discharge.

This can be seen by considering Fig. 3 again. As there seen, the normal discharge continues to the "minimum sustaining voltage" point 41. However, in embodiments of my invention the characteristic from substantially this very point is negative or may be slightly positive for a short range of currents and then negative, so that the sustaining voltage may be lower than at point 41. This decreased sustaining voltage is also of value in increasing operating margins in cross point switching networks employing such devices. This negative resistance will continue for a wide range of currents and will then become positive; the exact current values at which the negative characteristic commences and the exact current value at which the characteristic becomes positive may be determined in part by the gas pressure. Accordingly, I have found that the characteristic is negative for values of the product of pressure, $p$, in millimeters of mercury, and current, $i$, in amperes, within the range $0.2 < pi < 2.8$.

Fig. 3 depicts the general form of the current-voltage characteristic for embodiments of this invention and specifically for one specific embodiment at a gas pressure of 48.5 millimeters of mercury. If it is desired to consider more clearly the breakdown voltage and breakdown characteristics, including the so-called Townsend discharge, prior to breakdown and the normal glow discharge, it may be preferable to plot the logarithm of the current and/or the logarithm of the voltage. The exact current-voltage characteristic over one usable range of current values for this same specific illustrative embodiment is plotted in Fig. 4 for different gas pressures, the graph being of current and voltage, wherein the voltage is plotted logarithmically and the current is plotted linearly. It may be noted that in many of the subsequent figures logarithmic or semi-logarithmic scales are employed, but it is believed that these will be obvious from the figures without special reference drawn thereto.

Figure 4:
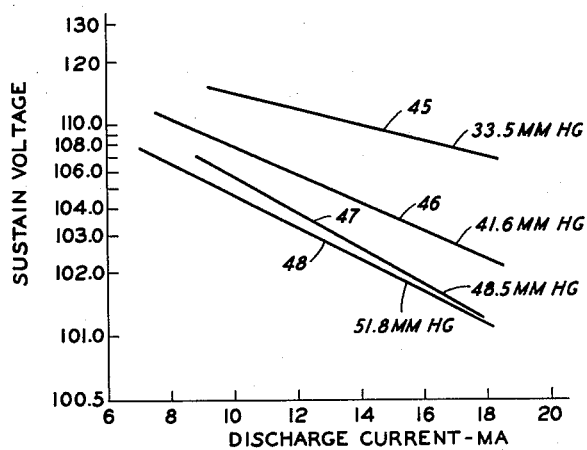
Fig. 4 is a plot of sustaining voltage against current for a specific illustrative embodiment of this invention at different gas pressures.

The specific illustrative embodiment of this invention for which data was taken, as represented by the curves of Figs. 3 and 4 and certain of the subsequent figures, as noted individually below, employed a cathode and a constriction configuration as illustrated in Figs. 1 and 2, having a molybdenum rod at one end of which a spherical cathode having a diameter, $d_c$, of 0.050 inch was formed; the orifice was circular with a diameter, $d_o$, of 0.0133 inch. The device had a gaseous atmosphere of neon.

In Fig. 4 four different curves are plotted for four different pressures of the gas within the device, namely, curve 45 for a pressure of 33.5 millimeters of mercury, curve 46 for a pressure of 41.6 millimeters of mercury, curve 47 for a pressure of 48.5 millimeters of mercury, and curve 48 for a pressure of 51.8 millimeters of mercury. The pressure and distance products for this embodiment and these four curves are tabulated below:

| Curve | Pressure, mm. of Hg | $pd_c$ | $pd_o$ | $d_o/d_c$ |
|---|---|---|---|---|
| | | mm. of Hg—cm. | | |
| 45 | 33.5 | 4.25 | 1.13 | .266 |
| 46 | 41.6 | 5.28 | 1.41 | .266 |
| 47 | 48.5 | 6.16 | 1.64 | .266 |
| 48 | 51.8 | 6.58 | 1.75 | .266 |

These curves are plotted over a range of currents of from about 8 to 18 milliamperes. However, a negative resistance can be attained over a much wider range of currents; thus, at a pressure of 48.5 millimeters of mercury I have found a useful negative resistance to be present in a current range of from about 4 to over 20 milliamperes, as seen in Fig. 3.

Figure 5:
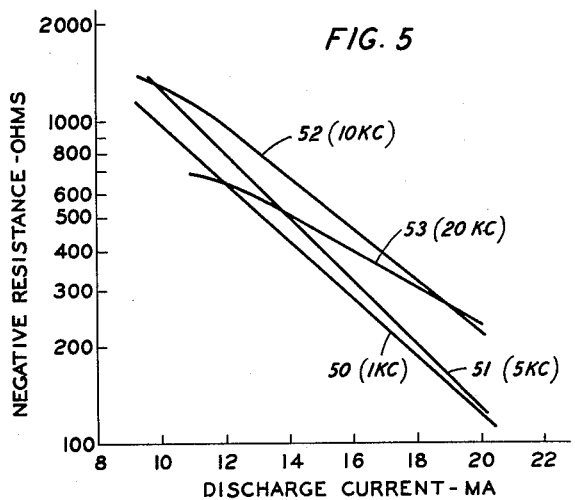
Fig. 5 is a plot of negative resistance against current for the embodiment of Fig. 4 at one specific gas pressure but different frequencies.

In Fig. 5 the effect of frequency of the signal through the device, as when used in a transmission path in a signaling or switching network, is apparent. Each of these curves represents data on the device discussed above with respect to Fig. 4 and with a pressure of 48.5 millimeters of mercury (curve 47). The different frequencies are as follows:

Curve: Frequency, kc.
50 _____ 1
51 _____ 5
52 _____ 10
53 _____ 20

It may be noted that the curves of Fig. 4 are direct current characteristics.

Figure 6:
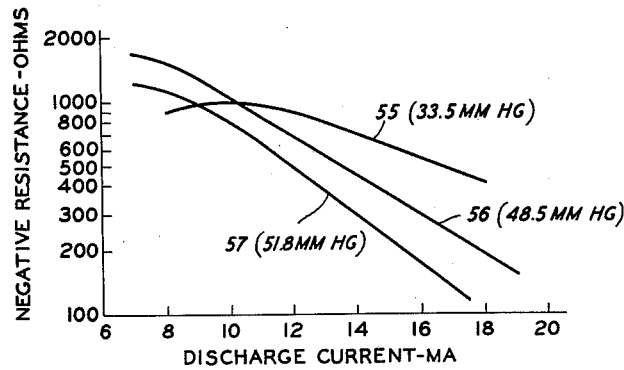
Fig. 6 is a plot of negative resistance against current for the embodiment of Fig. 4 at one frequency but different gas pressure.

In Fig. 6 the effect of gas pressure on the negative resistance at a single frequency of 2 kilocycles is depicted, the three curves representing the different pressures, as indicated below:

Curve: Pressure
55 _____ 33.5 millimeters of mercury.
56 _____ 48.5 millimeters of mercury.
57 _____ 51.8 millimeters of mercury.

These curves are also for the device described above with respect to Fig. 4.

As may be noted, the negative resistance varies approximately in the range of from 100 to 1000 ohms over this range of currents, with slight variations in the value of the resistance at a particular current value due to pressure or frequency. As noted above, this data is with respect to a specific illustrative embodiment wherein a neon filling was employed. However, in other specific illustrative embodiments of this invention wherein a neon and helium mixture is utilized as the gaseous filling of the device and wherein the anode is slightly offset from the orifice, as depicted in Fig. 1, the negative resistance is substantially constant over a wide range of currents and an anode glow has been observed as a sheath around the anode wire. Despite the presence of the glow, noise-free operation has been observed. When, however, the anode is positioned directly opposite the orifice, the anode glow disappears and the resistance current characteristic for a neon-helium mixture is substantially as indicated in Figs. 5 and 6 for a pure neon gas filling.

Figure 7:
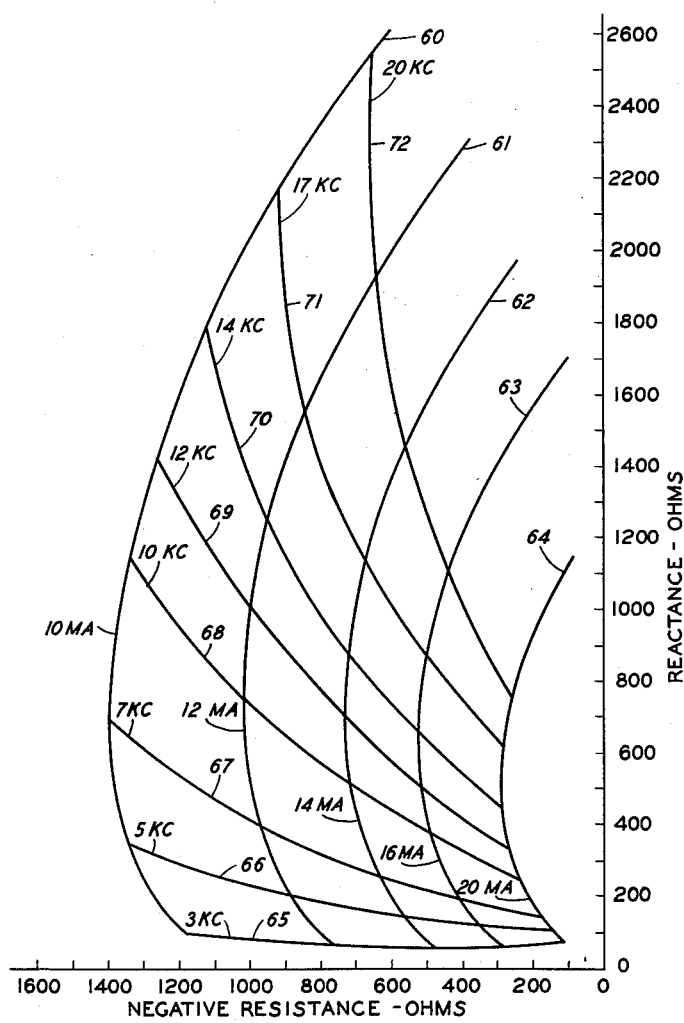
Fig. 7 is a plot of negative resistance and reactance for the specific embodiment of Figs. 4, 5, and 6 at different frequencies and operating currents, but at the gas pressure of the plot of Fig. 5.
Figure 8:
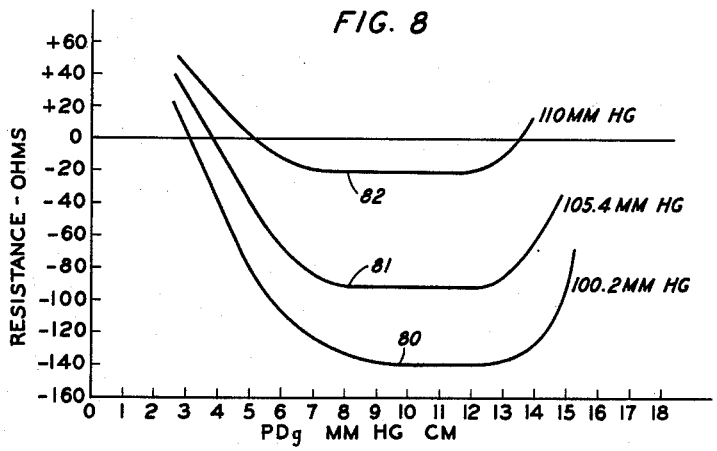
Fig. 8 is a plot of negative resistance as a function of the anode-to-cathode gap at one frequency but different gas pressures for a different specific illustrative embodiment of this invention.

Fig. 7 is an impedance plot of reactance and negative resistance for the specific embodiment described above with respect to Fig. 4 wherein a neon gas was employed. In the plot of Fig. 7 the effects of current and frequency are indicated for a single gas pressure, 48.5 millimeters of mercury. Each of curves 60 to 64 represents a constant current and each of curves 65 to 72 a constant frequency, as follows:

Curve: Current, milliamperes
60 _____ 10
61 _____ 12
62 _____ 14
63 _____ 16
64 _____ 20

Frequency, kc.
65 _____ 3
66 _____ 5
67 _____ 7
68 _____ 10
69 _____ 12
70 _____ 14
71 _____ 17
72 _____ 20

One of the advantages attainable by the utilization of a constricting orifice in the discharge path between the hollow cathode and the anode is the realization of a negative resistance characteristic with larger anode-cathode spacings and accordingly with higher breakdown voltages. As discussed more fully in the above-mentioned Townsend patent, one critical limitation on the attainment of a negative resistance by the combination therein set forth was that the anode must be spaced from the cathode a distance less than the anode limit, and this limit was reached fairly close to the cathode. However, in embodiments of my invention wherein a constricting orifice is utilized, I have found that the anode limit, while still present, nevertheless is considerably removed from the cathode. This can be seen by reference to Fig. 8 which is a plot of resistance as a function of anode-cathode distance, $d_g$, as measured by the product $pd_g$ for various pressures in a single specific illustrative embodiment. This embodiment, which was also of the general configuration of Fig. 1 with a cathode as depicted in Fig. 2, had a neon filling; the cathode dimensions were cathode diameter, $d_c$, 0.028 inch and orifice diameter, $d_o$, 0.0068 inch. The three curves indicated are for pressures as follows:

| Curve | Pressure, mm. of Hg | $pd_c$ | $pd_o$ | $d_o/d_c$ |
|---|---|---|---|---|
| | | mm. of Hg—cm. | | |
| 80 | 100.2 | 7.13 | 1.73 | .24 |
| 81 | 105.4 | 7.50 | 1.82 | .24 |
| 82 | 110.0 | 7.82 | 1.90 | .24 |

As can be seen, the resistance remains negative over a wide range of anode spacings and also remains constant over a substantial portion of the range. A comparison of this range with the anode limit range of devices as disclosed by Townsend can be appreciated by the fact that for a comparable device without the constricting orifice of my invention, the negative resistance would commence similarly at about a $pd_g$ of 4 but would become positive at about only 7; in this figure $d_g$ is the anode-cathode gap measured to the closest point of breakdown, which in embodiments of my invention is to the surface of the barrier or edge itself. Further, as before, pressure is expressed in millimeters of mercury and distance in centimeters.

Figure 9:
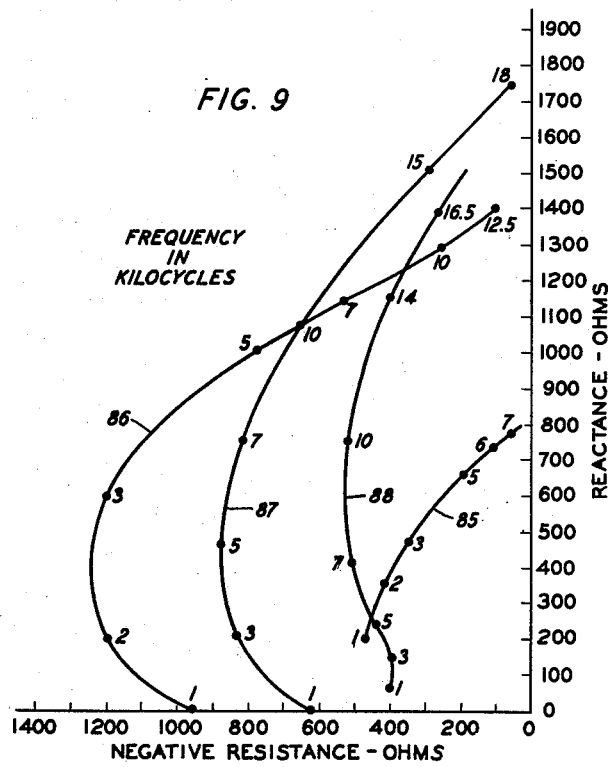
Fig. 9 is a plot of negative resistance as a function of the size of the constricting orifice at different frequencies but constant pressure and current for another specific illustrative embodiment of this invention.

Fig. 9 indicates the effect of different orifice diameters, and accordingly different ratios of $d_o/d_c$ and different products $pd_o$ in another specific illustrative embodiment of this invention wherein the cavity diameter, pressure, and current are constant. This embodiment, which was also of the type disclosed in Fig. 1 and with a cavity cathode and integral barrier of the type shown in Fig. 2, has a filling of neon at a pressure of 48.5 millimeters of mercury, a cavity diameter of 0.070 inch, giving a product $pd_c$ of 8.62 millimeters of mercury-centimeters, and the data plotted in Fig. 9 was taken at a current of 16 milliamperes. The four curves depict the relationship of negative resistance and reactance at different frequencies for four different orifice diameters, as follows:

| Curve | $d_o$, inches | $pd_o$ mm. of Hg—cm. | $pd_c$ mm. of Hg—cm. | $d_o/d_c$ |
|---|---|---|---|---|
| 85 | .0118 | 1.35 | 8.62 | .169 |
| 86 | .0126 | 1.44 | 8.62 | .180 |
| 87 | .0137 | 1.57 | 8.62 | .196 |
| 88 | .0148 | 1.71 | 8.62 | .213 |

The frequency points at which data were taken are indicated in the figure.

While this invention has been mainly described above with respect to one particular cathode structure, as depicted in Fig. 2, it is to be understood that other cathode structures may also be employed in accordance with the teaching and concepts of my invention. Reference is made to copending application Serial No. 583,665, filed May 9, 1956, of R. L. Mueller and W. G. Stieritz, now United States Patent 2,899,588, issued August 11, 1959, wherein similar cavity cathodes are disclosed embodying my invention. Further, as discussed above, the cathode may be of other than spherical shape, provided it is a source of high density electron emission and has a low work function; accordingly, hollow cathodes and such of substantially spherical configuration are advantageously employed. I have found that such configurations aid in increasing the current range over which a high negative resistance occurs. Additionally, the physical barrier interposed in the discharge path between the high density source and the anode need not be integral with the cathode, but because of the very small dimensions involved this is an advantageous configuration.

In accordance with another aspect of my invention the cavity cathode, as depicted in Fig. 2 and discussed above, may advantageously be fabricated by a self-forming technique. In this manner the cathode is formed to attain the desired negative resistance characteristic after the device itself has been fabricated, processed, and sealed off. The cathode then self-forms to its optimum shape.

Figure 10:
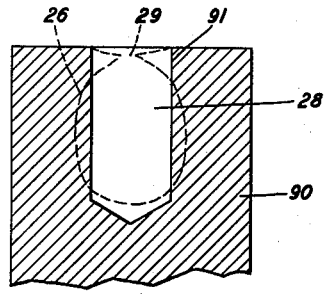
Fig. 10 is a sectional view of a cavity cathode prior to the self-forming and aging processes in accordance with this invention, the finished cathode being shown in dotted form.

Fig. 10 is a sectional view of a molybdenum cathode rod 90 having a small cylindrical hole 91 drilled axially into one end; this comprises the preforming of the cathode prior to its incorporation into the device. I have found that by an aging process the cylindrical hole 91 self-forms into the cavity cathode 26 having the substantially spherical emitting or cathode portion 28 and the constricting orifice 29, described above with reference to Fig. 2. The aging process to attain the self-forming may utilize various current values and various times, depending, in part, on the size of the hole 91, the gas pressure, the final dimensions desired for the cathode and constriction, and the amount of material to be removed, i.e., on the actual size of the cathode.

In one specific illustrative forming and aging process in accordance with my invention, the cylindrical hole 91 had a diameter 0.014 inch and a depth of from 0.040 to 0.042 inch. The device in which this preformed cathode rod was included had a gas pressure of 125 millimeters of mercury. The device was first operated for one hour at a current of 30 milliamperes to form the cavity 26 and was then operated for a hundred hours at normal operating current of 10 milliamperes to stabilize the negative resistance and transmission characteristics of the cavity. This is exemplary of what might be referred to as a high current technique wherein the cavity is formed in a relatively short time.

In another specific illustrative forming and aging process, in accordance with my invention, the cylindrical hole 91 had a diameter of 0.0165 inch and a depth of from 0.039 to 0.040 inch. In this embodiment the cavity 26 was formed, aged, and its characteristics stabilized by operating the device at 10 milliamperes for 300 hours. This is exemplary of a relatively low current method which, however, requires a considerably longer period of time.

Figure 11:
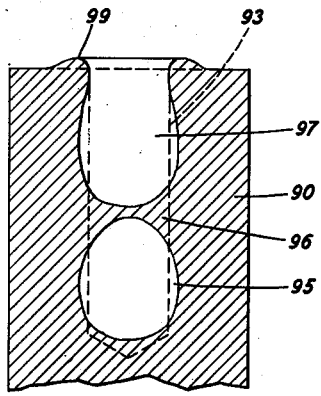
Fig. 11 is a sectional view of a misformed cavity cathode wherein the ratio of initial cylindrical hole diameter to hole depth was too small, the initial hole being shown in dotted form.
Figure 12:
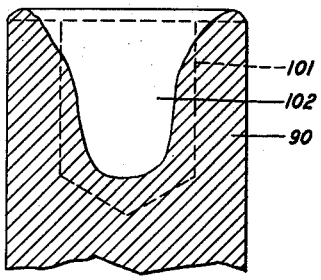
Fig. 12 is a sectional view of another misformed cavity cathode wherein the ratio of initial cylindrical hole diameter to hole depth was too large, the initial hole being shown in dotted form.

In order for the self-forming to occur during the forming and aging processes, discussed above, it is necessary that the preformed hole 91 be of proper dimensions and specifically that the ratio of hole diameter to depth of hole be such as to allow forming to occur. Specifically, I have found a ratio of 1:2 or 1:3 to be satisfactory. Figs. 11 and 12 depict the cavity formations with this ratio is not proper. In Fig. 11 a hole 93 has been drilled into the cathode rod 90, the hole 93 being too deep in relation to its diameter for proper forming; thus, in this instance the ratio of hole diameter to depth is too small. In such a case when it is attempted to form the cavity by aging, more than one such cavity will be formed. In the instance depicted in the drawing, an enclosed cavity 95 having a barrier portion 96 was formed at the bottom of the hole 93; then on top of the portion 96 a second cavity 97 was formed. In this instance there is no orifice or communication between the two cavities. The desired construction is generally not formed by cavity 97. A lip 99 is formed above the upper edge of the rod 90 by build-up of material from the cavity.

In the instance depicted in Fig. 12 the diameter of the hole 101 was too large for the hole depth, i.e., the ratio of hole diameter to depth was too large. When this is the case, the lip of the hole sputters away leaving an unformed cavity 102 having a funnel-shaped appearance.

It is to be understood that the above-described arrangements are illustrative of the application of the principles of the invention. Numerous other arrangements may be devised by those skilled in the art without departing from the spirit and scope of the invention.

What is claimed is:

1. A gaseous discharge device having a negative resistance in the abnormal discharge region comprising an enclosing envelope having a gaseous atmosphere therein, an anode, a source of high density electron emission opposite said anode, and a physical metallic barrier adjacent said source, between said anode and said source, and electrically connected to said source, said barrier being across said source and shielding the anode from said source and having an orifice therein for passage of electrons from said source to said anode, the diameter of said orifice being related to the gas pressure and to the electron source to attain a negative resistance in the abnormal discharge region over a range of currents such that the product of the pressure and current, expressed in millimeters of mercury-amperes, is within the range substantially from .2 to 2.8 and said source having a lower sustaining voltage to said anode than said barrier.

2. A gaseous discharge device in accordance with claim 1 wherein said source has a lower work function than said barrier.

3. A gaseous discharge device in accordance with claim 1 wherein said barrier is formed integrally with said source.

4. A gaseous discharge device in accordance with claim 1 wherein said source has a substantially hollow spherical surface toward said orifice.

5. A gaseous discharge device having a negative resistance characteristic in the abnormal discharge region comprising an envelope having a gaseous atmosphere therein, an anode, a source of high density electron emission opposite said anode, and a physical conducting barrier adjacent said source, between said anode and said source, and electrically connected to said source, said barrier being across said source and shielding said anode from said source and having an orifice therein constricting the discharge between said source and said anode, said orifice having an equivalent diameter such that the product of the orifice diameter and pressure of said gaseous atmosphere is within the range from substantially .6 to 5, expressed in millimeters of mercury-centimeters.

6. A gaseous discharge device having a negative resistance characteristic in the abnormal discharge region comprising an envelope having a gaseous atmosphere therein, an anode, a hollow cathode source of high density electron emission opposite said anode, and a physical conducting barrier adjacent said source, between said anode and said source, and electrically connected to said source, said barrier shielding said anode from said source and having an orifice therein constricting the discharge between said source and said anode, the hollow cathode source having an equivalent spherical diameter such that the product of said diameter and the pressure of said gaseous atmosphere is within the range from substantially 4 to 30, expressed in millimeters of mercury-centimeters.

7. A gaseous discharge device having a negative resistance characteristic comprising an anode, a substantially spherical hollow cathode source of high density electron emission opposite said anode, and a physical conducting barrier between said anode and said source and having a substantially circular aperture therein constricting the discharge between said source and said anode, the ratio of the diameters of said constricting orifice to said hollow spherical cathode being in the range from one-tenth to one-half.

8. A gaseous discharge device in accordance with claim 7 wherein said ratio is in the range of from one-sixth to one-third.

9. A gaseous discharge device having a negative resistance characteristic in the abnormal discharge region comprising an envelope having a gaseous filling therein, an anode, a substantially spherical hollow cathode source of high density electron emission opposite said anode, and a physical conducting barrier between said anode and said source and having a substantially circular aperture therein constricting the discharge between said anode and said source, the product of the orifice diameter and the pressure of said gas being within the range from substantially .6 to 5 and the product o fthe diameter of said hollow sphere and the pressure of said gas being within the range from substantially 4 to 30, said products being expressed in millimeters of mercury-centimeters.

10. A gaseous discharge device in accordance with claim 9 wherein said gaseous filling comprises neon.

11. A gaseous discharge device in accordance with claim 9 wherein said gaseous filling comprises a mixture of neon and helium.

12. A gaseous discharge device comprising an enclosing envelope having a gaseous atmosphere therein, a cathode within said envelope and comprising a conductive body having an upper surface and a substantially spherical cavity within said body and communicating to said surface through a small orifice of smaller size than the diameter of said cavity, and an anode positioned within said envelope opposite said surface, the size of said cavity and orifice, the pressure of said gaseous atmosphere, and the distance of said anode from said surface being mutually related so that said device has a negative resistance over a wide range of currents in the abnormal discharge region, said range being dependent on said pressure.

13. A gaseous discharge device comprising an enclosing envelope having a gaseous atmosphere therein, an anode, a conductive member having an upper surface opposite said anode and a substantially hollow spherical cavity within said member and communicating to said surface through a small substantially circular orifice, whereby said surface is interposed between said hollow spherical cavity and said anode, and said orifice serves to constrict the discharge between said hollow spherical cavity and said anode to attain a negative resistance characteristic over a wide range of currents in the abnormal discharge region, said range being dependent upon said pressure, and the ratio of the diameters of said constricting orifice and said hollow spherical cavity being in the range from one-tenth to one-half.

14. A gaseous discharge device in accordance with claim 13 wherein said ratio is in the range from one-sixth to one-third.

15. A gaseous discharge device having a negative resistance characteristic in the abnormal discharge region comprising an enclosing envelope having a gaseous atmosphere therein, an anode positioned within said envelope, a conducting rod within said envelope and having an upper surface opposite said anode, said rod having a substantially spherical cavity therein adjacent said surface and communicating to said surface through a substantially circular orifice, the size of said cavity and said orifice, the pressure of said gaseous atmosphere, and the positioning of said anode being mutually related so that said device has a negative resistance over a range of currents in the abnormal discharge region such that the product of the pressure and current expressed in millimeters of mercury-amperes is substantially within the range of .2 to 2.8.

16. A gaseous discharge device having a negative resistance characteristic in the abnormal discharge region comprising an envelope having a gaseous atmosphere therein, an anode positioned within said envelope, and a solid conducting rod within said envelope and having an upper surface opposite said anode and a substantially hollow spherical cavity within said rod and communicating to said surface through a substantially circular orifice, the ratio of the diameters of said orifice and said hollow spherical cavity being in the range of from one-tenth to one-half.

17. A gaseous discharge device in accordance with claim 16 wherein said ratio is in the range of from one-sixth to one-third.

18. A gaseous discharge device in accordance with claim 16 wherein said cavity has a diameter such that the product of said diameter and the pressure of said gaseous atmosphere is within the range of from substantially 4 to 30 expressed in millimeters of mercury-centimeters.

19. A gaseous discharge device in accordance with claim 16 wherein said circular orifice has a diameter such that the product of said diameter and the pressure of said gaseous atmosphere is within the range of substantially .6 to 5 expressed in millimeters of mercury-centimeters.

20. A gaseous discharge device in accordance with claim 17 wherein said gaseous atmosphere is of neon.

21. A gaseous discharge device in accordance with claim 17 wherein said gaseous atmosphere is of a mixture of neon and helium and said anode comprises a wire positioned so as to be offset from said orifice.

22. The method of fabricating a cathode for a gaseous discharge device comprising forming a hollow portion in a metallic body adjacent one edge thereof and applying a current discharge to said hollow portion for a period of time sufficient to sputter metallic material from certain areas of said hollow portion to other areas of said hollow portion to cause said hollow portion to assume a substantially spherical shape for the attainment of a negative resistance and further applying a discharge to said hollow portion to stabilize the negative resistance and operating characteristics of the hollow portion.

23. The method of fabricating a cathode for a gaseous discharge device comprising forming a cavity in a metallic body, subjecting said cavity to a current discharge to cause selective erosion and deposition of material of the body within the cavity, and applying normal operating current to the cavity to stabilize the operating characteristics of the cavity.

24. The method of fabricating a cathode for a gaseous discharge device having a negative resistance characteristic comprising forming an initial cavity in a metallic body adjacent one edge thereof, subjecting the cavity to a high current discharge for a first period of time to cause selective erosion and deposition of material of said body within the cavity, and subsequently subjecting the cavity to a lower current discharge for a longer period of time to stabilize the negative resistance characteristic of the cathode.

25. The method in accordance with claim 24 wherein the high current discharge is greater than the normal operating current of the cathode and the lower current discharge is substantially the normal operating current of the cathode.

26. The method of fabricating a cathode for a gaseous discharge device having a negative resistance characteristic comprising forming a cavity in a metallic body, assembling said body in a gaseous discharge device as the cathode thereof, subjecting said cavity to a first current discharge to form said cavity into a substantially spherical shape by selective removal and deposition of the material of the body within the cavity, and subjecting said substantially spherical cavity to a second current discharge to stabilize the negative resistance characteristic of said cathode.

27. The method in accordance with claim 26 wherein said first current discharge is of a larger current than said second current discharge.

28. The method in accordance with claim 26 wherein said first and second current discharges are of the same value of current.

29. The method of fabricating a cathode for a gaseous discharge device having a negative resistance characteristic comprising forming a cylindrical hole in the end of a metallic body and applying a current discharge to said hole for a period of time sufficient to sputter metallic material from the sides thereof to cause said hole to assume a substantially spherical shape communicating to the end of said body through an orifice of smaller diameter than the diameter of said hole.

30. The method in accordance with claim 29 further comprising applying a further discharge to said substantially spherically shaped hole to stabilize the negative resistance characteristic of the cathode.

References Cited in the file of this patent

UNITED STATES PATENTS

| | | |
|---|---|---|
| 1,809,447 | Howard | June 9, 1931 |
| 1,834,251 | Moore | Dec. 1, 1931 |
| 1,991,480 | Williams | Feb. 19, 1935 |
| 2,190,308 | Blackburn | Feb. 13, 1940 |
| 2,673,304 | Beese | Mar. 23, 1954 |

FOREIGN PATENTS

| | | |
|---|---|---|
| 239,109 | Switzerland | Dec. 3, 1945 |

OTHER REFERENCES

Journal of Applied Physics, vol. 26, pages 1176 to 1179, September, 1955.